Aug. 13, 1935. J. WARD Re. 19,670
METHOD AND APPARATUS FOR FEEDING TAPE AND PROJECTING IMAGES THEREFROM
Original Filed May 18, 1928 2 Sheets-Sheet 1
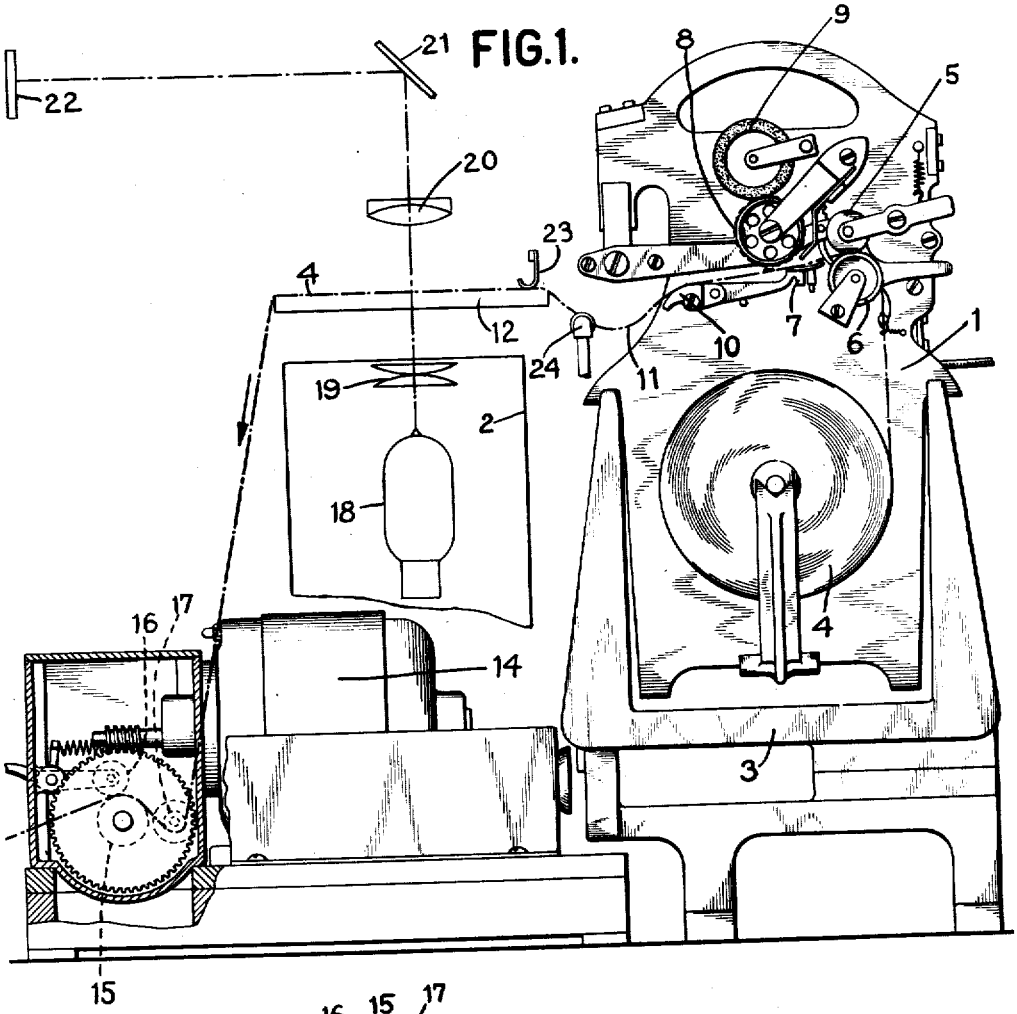
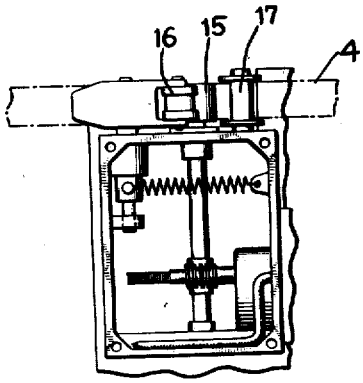
FIG.2.
Joshua Ward
INVENTOR
BY Ward & Crosby
his ATTORNEYS

METHOD AND APPARATUS FOR FEEDING TAPE AND PROJECTING IMAGES THEREFROM

Original Filed May 18, 1928 2 Sheets-Sheet 2

Joshua Ward

INVENTOR

BY Ward & Cushby his ATTORNEYS

Reissued Aug. 13, 1935

Re. 19,670

UNITED STATES PATENT OFFICE 19,670

METHOD AND APPARATUS FOR FEEDING TAPE AND PROJECTING IMAGES THEREFROM

Joshua Ward, Summit, N. J., assignor to Trans-Lux Daylight Picture Screen Corporation, New York, N. Y., a corporation of Delaware Original No. 1,999,552, dated April 30, 1935, Serial No. 278,744, May 18, 1928. Application for reissue May 23, 1935, Serial No. 23,056

22 Claims. (Cl. 88—24)

Figure 3:
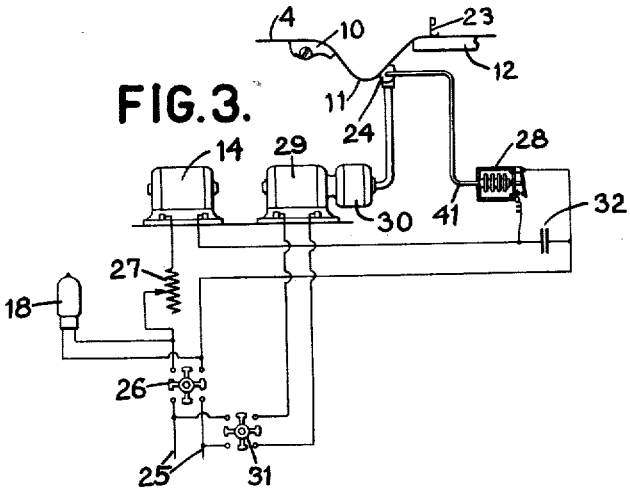

This invention relates to method and apparatus for feeding tape and projecting images therefrom. The invention is particularly useful in connection with stock tickers, for feeding and projecting the stock quotation tape, although it is to be understood that the invention is applicable for use in connection with other devices and tapes. Since the invention has proven to be of great use in its embodiment in connection with such work it is so described, by way of illustration only; although the invention will be found of use in many devices where it is desired to feed tape by two feeding means and to control one of these means by the difference in the rate of speed between these two means, and more particularly where one of these means feeds the tape with a pulsating motion and the other with a relatively non-pulsating motion.

The apparatus to be presently described comprises the usual form of stock quotation ticker or the like, from which tape on which quotations have been printed is ejected from the ticker with a pulsating motion and is moved past a projecting station, during which movement it is desired to have the tape move with a non-pulsating motion in order to obviate the pulsations which would otherwise occur in the images so projected. It will therefore be seen that the problem presented is to change the pulsating movement of the tape into a non-pulsating or relatively steady movement of the tape at the projection axis; and it is also desirable to control the non-pulsating movement of the tape in accordance with the rate of pulsating feed from the ticker so as not to interfere with the ticker operation. In devices heretofore proposed and utilized for this class of work, this control has been dependent upon the use of a member resting upon the tape between the ticker and projector, and in some instances the member riding upon the substantially extended tape with a quite jerky motion, and in other cases the member riding upon the loop of the tape between the ticker and projector and being raised and lowered by the shortening or lengthening of this loop. In both of these solutions it has been necessary to limit the size of this member and so position it that it will fall between the two lines of printed images or characters appearing on the tape so as not to blur or smear the freshly printed characters. In either event the function of this member has been to control the operation of the means for feeding the tape past the projecting station in accordance with the pulsating feed of the tape from the ticker.

An object of this invention is to provide a method and means for controlling the non-pulsating feed means in accordance with the pulsating feed of the tape from the ticker and to produce a relatively non-pulsating feed past the ticker station, without utilizing any member in engagement with the upper or printed surface of the tape for such control.

A further object of the invention is to provide method and means allowing a more flexible and sensitive control than has heretofore been possible so as to provide a steadier or smoother feed of the tape past the projection axis.

The invention consists in the method herein described and in the novel features, arrangement, construction and combination of parts of the apparatus and means hereinafter described in accordance with certain preferred embodiments thereof, and the invention will be more particularly pointed out in the appended claims.

Further objects of the invention will more fully appear from the following description taken in connection with the accompanying drawings illustrating by way of example the preferred embodiment of the apparatus used in carrying out the method.

Figure 4:
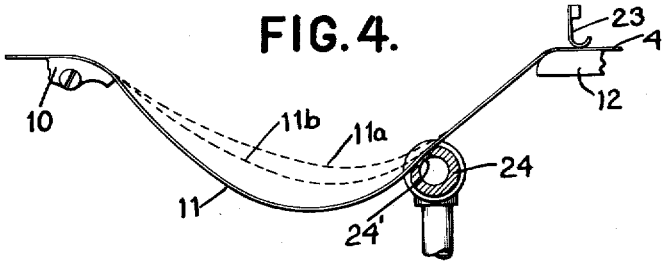
Figure 5:
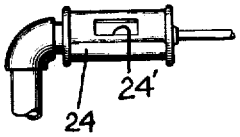
Figure 6:
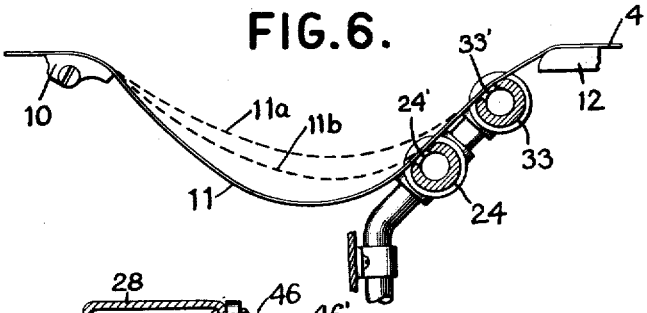
Figure 7:
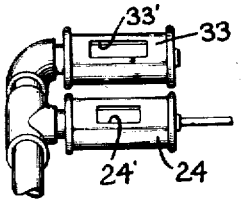
Figure 8:
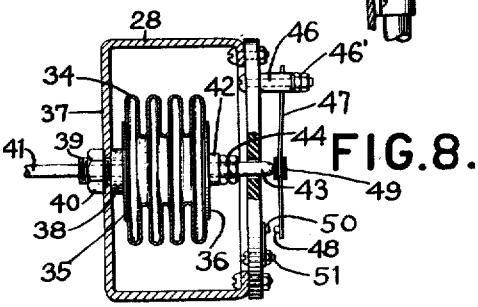

In the accompanying drawings, showing by way of example the present preferred embodiment of the invention:

Fig. 1 is a rear elevation showing certain parts diagrammatically for purposes of clarity, Fig. 2 is a detail plan view of a part of the apparatus of Fig. 1, Fig. 3 is a diagrammatic view illustrating the arrangement of parts of the apparatus, Fig. 4 is a detailed view in front elevation showing a part of the control means and its relative position to the tape, Fig. 5 is a side elevation of the part of the control means shown in Fig. 4, Fig. 6 is a view similar to Fig. 4 showing a modified form of friction creating device, Fig. 7 is a view similar to Fig. 5 but showing the corresponding parts of Fig. 6, and Fig. 8 is a cross section in elevation of the suction sensitive control element and control switch.

Referring to the drawings and more particularly to Fig. 1: the ticker mechanism will be designated in general as 1, and the projecting device will be designated in general as 2. The ticker 1 represents a suitable device for recording images to be projected on tape and for ejecting the tape with the images thereon with a pulsating movement; such for example as the well known Western Union stock quotation ticker. The ticker 1 merely illustrates a suitable form of device for ejecting tape with a pulsating motion, and since the device shown is in wide use and is well understood by those skilled in the art, no detail description of the same will be given. For purposes of ready reference the principal parts only will be described. The frame of the device is designated as 3 and provides a means for supporting a roll of tape 4, which for the present purposes is made of transparent or translucent material, such for example as cellulose or paper. The tape from roll 4 passes upwardly between feed rolls 5 and 6, from whence it passes over the platen mechanism 7 and beneath the type wheel 8, which is in contact with the ink roll 9. As is well understood by those skilled in the art, the type wheel 8 carries two rows of printing characters, such as numerals and figures respectively, and is adapted to come into cooperative position with the platen means 7 to print the two sets of characters on respectively opposite margins of the tape 4. From this position the tape passes over a support 10 and is formed into a loop 11.

The loop 11 terminates adjacent the edge of the table 12 of the projector 2, across which the tape passes and then passes downwardly to a take-up device, which is operated to feed the tape 4 across the table 12. The forward end of table 12 also provides a support for the tape in its path of movement from the ticker to the projection axis; and this support is so positioned as to provide a space in the path of travel of the tape for the formation of the loop. The take-up device may be of any suitable form and in the present embodiment comprises an electrical motor 14 suitably geared to and driving a wheel 15, between which and the resiliently pressed idle wheel 16 the tape is engaged to be moved in the direction as indicated; and the tape is passed around the idle roll 17 to increase its peripheral engagement with the wheel 15. This take-up motor is such that if not retarded under control of the ticker feed, it will feed the tape from the loop faster than it is fed to the loop by the ticker. The projector lamp is designated as 18 and the light therefrom is passed through a suitable lens set 19 and thence through the projector table 12 and the lens set 20 against a reflecting mirror 21, which is adapted to reflect the light through a translucent projecting surface, such as 22, arranged in a vertical plane.

A suitable means, such as the J spring 23, engages the tape adjacent the end of the projector table 12 contiguous to the loop 11 and is adapted to create sufficient friction to entirely absorb any pulsations produced by the ticker that may not have been absorbed by the loop and suction means heretofore described; so as to eliminate such pulsations at the projection axis.

A pneumatic suction valve opening 24′ (Fig. 4) is provided in the member 24 which is positioned intermediate the projector table 12 and the ticker support 10, and it is in such position that the valve opening is in the path of movement of the tape in the loop 11 and is closed by the tape of the loop 11 in the position shown in Fig. 1, but is opened when the loop 11 is shortened; as will be more particularly pointed out following.

Referring more particularly to Fig. 3: it will be seen that the motor 14 is adapted to be connected to the power line 25 by means of the switch 26; and the projector lamp 18 is similarly connected. A variable resistance 27 is placed in one side of the power line between the switch 26 and the motor 14 for the purposes of regulating the speed of the motor. A suction responsive control switch 28 is placed in the other side of the motor circuit and is operated responsive to the closing and opening of the valve member 24 by the tape loop 11; suction being furnished for such purposes by suitable means, such for example as the electrical motor 29 driving the fan 30. The motor 29 is adapted for continuous operation and is connected to the power line 25 by means of a suitable switch, such as 31. A condenser 32 is preferably placed across the contacts of the control device 28 to prevent arcing.

In place of the J spring 23, additional pneumatic means may preferably be utilized for creating the desired friction to prevent any pulsations of the tape from the ticker reaching the projecting position of the tape. I have illustrated such apparatus in Fig. 6 wherein the suction head 33 is shown in communication with the suction member 24 and is provided with an opening 33′ across which the tape is adapted to pass to thereby create sufficient friction to hold the tape firmly against the projector table 12, and prevent the pulsating movements from affecting the projecting zone of the tape.

The pneumatically sensitive control switch 28 will now be more particularly described with reference particularly to Fig. 8. A pneumatically sensitive element such as the diaphragm 34, in the form of a deeply corrugated tube provided with ends 35 and 36, is mounted in a C frame 37 by means of a sleeve 38 attached to the end 35, which is interiorly threaded to receive a nipple 39, which passes through the frame 37 and is engaged on the side opposite to the sleeve 38 by a lock nut 40. A small tube 41 is attached to the nipple 39 forming an air-tight connection therewith and is in communication with the interior of the diaphragm 34 which is otherwise substantially airtight; having its other end in communication with the member 24 provided with the valve opening 24′ to vent the diaphragm to atmospheric pressure. The head 36 carries a threaded sleeve 42, into which is threaded a plunger 43 adapted to be adjusted axially with respect to the sleeve 42 and provided with lock nuts 44 for securing the same in adjusted position. An insulating plate 45 is fastened to the open side of the C frame 37 and to this plate are attached spaced insulating plugs 46, which carry suspended therefrom and attached thereto by means of the binding posts 46′ a contact spring arm 47 bearing at its lower end a suitable contact point 48, and being provided with an insulating plug 49 in engagement with the plunger 43. A contact point 50 is attached to the insulating plate 45 by means of the binding post 51 and the contact point 50 is in position for making contact with the contact point 48. The diaphragm 34 is merely illustrative of a suitable pneumatically sensitive device and may be replaced, if desired, by a Bourdon spring such as is used in pressure gauges and is well known to those skilled in the art, or by other suitable means. The sensitiveness of this pneumatically responsive device is dependent of course upon the suction employed, the relative stiffness of the tape, the resiliency of the contact arm 47 and possibly other elements which will be readily appreciated by those skilled in the art after understanding the present invention. In the device which has been successfully used embodying this invention, as illustrated in Fig. 3, a suction equivalent of about 3″ of water has proven entirely satisfactory in conjunction with a diaphragm 34 substantially sensitive to a suction equivalent of about 1" of water; and wherein the air vent or valve opening 24' was of a size of about $\frac{3}{16}$" by $\frac{5}{16}$" and the bore of tube 41 was relatively small. In connection with the above example, the J spring was used for creating friction; although it is obvious that the control head 24 creates a certain amount of friction when sucking on the tape so as to co-operate with the loop to reduce the pulsations.

When utilizing the suction head 33 in place of the J spring 23, it is desirable to employ a hole 33' somewhat larger than the hole such as 24', above noted, in order to create a sufficient constant friction to further absorb the pulsations of tape. And in such cases the total suction will of course be of a sufficient degree to provide a suction for the head 33 at such times as the orifice 24' is uncovered due to the shortening or raising of the loop 11 of the tape; the size of the orifice 24' and the sensitiveness of the diaphragm being so balanced that the diaphragm will be contracted when the orifice 24' is closed, and will be expanded when the orifice 24' is open; the degree of control will also obviously be influenced by the size of the bore of the tube 41.

*Operation*

Referring more particularly to Figs. 1 and 3: the ticker 1 is started in operation and the switches 26 and 31 are closed. At this time the motor 29 is operating the suction creating device, such as the fan 30, to create suction in the head 24; but the circuit of the motor 14 is still open due to the extended position of the diaphragm 34 which maintains the contacts 48 and 50 (Fig. 8) in open position, at all times when the tape 4 has not passed the lower limit indicated by the dash line 11*a* in Fig. 4. As the tape is ejected from the ticker, with a pulsating motion, the tape 4 increases the depth of the loop formation, so that the loop moves downwardly to the form indicated as 11, at which time the orifice 24' in suction head 24 is closed, thereby applying suction through the tube 41 to the diaphragm 34; which contracts the diaphragm 34 axially allowing the contact 48 to be moved into engagement with the contact 50 under the influence of the flexure of the contact spring 47. This closes the circuit of the motor 14 and starts the motor in operation to move the tape 4 across the support 12 and past the projecting zone. In this connection it is to be noted that even when the tape reaches the position indicated as 11*b* (Fig. 4) the motor is still running under the regulative control of the pneumatically sensitive device 28, due to the partial restriction of the orifice 24'. It has been found in practice that when the tape is approximately at the position indicated in Fig. 4 as 11*b*—where the valve opening 24' is partially restricted—the motor 14 is under positive regulative control of the pneumatic control means, but is substantially continuously running to feed the tape past the projecting zone with a continuous motion. This is due to the rapid make and break of the contacts 48 and 50, and to the rotative inertia of the take-up motor armature, as will be hereinafter explained. The loop 11*b* is constantly being urged toward the opening 24' by suction from the orifice 24'; but at the same time the motor 14 is pulling the tape and tending to decrease the loop depth to thereby fully open the orifice 24'. The diaphragm 34 being sensitive within the variations between the open and closed position of the orifice 24' is thus maintained in what might be termed a floating condition, i. e. it is extremely sensitive to movement in either position and thereby maintains the contact points 48 and 50 in a substantially floating state, i. e. in a rapid vibration resulting in a relatively high rate of "make and break", such as to interrupt the flow of current to the motor at a corresponding high rate. Due to the inertia of the rotating motor armature this frequent interruption does not permit the actual stopping of the motor, but, in effect, merely regulates its speed commensurate with the rate of ejection of tape from the ticker. In other words, I have found that this very sensitive and flexible control appears to give a variable continuous feed of the tape past the projecting station through wide ranges of operation of the ticker. This nicety of balance is maintained for substantial periods of time and during such periods as the ticker is in fairly continuous operation during which operation, however, the tape is being ejected from the ticker with a pulsating feed.

It will be appreciated that the ticker ejects the tape with a pulsating movement, the pulsations corresponding in general to the respective images being recorded, and hence when the images are being recorded at a rapid rate (as for example during a fast market), the pulsations follow in rapid succession; but nevertheless with a pulsating or jerky feed. The images when projected are very greatly magnified, and hence any pulsation of the tape, resulting in vibrations of the images projected therefrom, are undesirable; since even the least vibration when so magnified would make the viewing of the images extremely difficult. It is therefore very desirable to have the images move through the projection zone with as nearly a continuous motion as is possible. This has been accomplished in the present invention and is considered of great importance. When the ticker is operating continuously but varying in its speed of ejecting tape, the take-up motor is so governed by the pneumatic control device that this motor operates substantially continuously but at a variable speed commensurate with the ticker feed. There is thus provided a control which is far more sensitive than is possible with the form of control such as heretofore has been employed. The motor 14 feeds the tape across the table 12 and the tape is frictionally held against the table 12 by the J spring 23, which engages the tape between the two spaced lines of images and entirely prevents the pulsations of the tape in the loop from reaching the projecting zone. When the ticker fails to eject tape with a sufficient speed to maintain the loop at a point at least as low as that indicated at 11*b*, and the orifice is left sufficiently unrestricted, the suction is vented through the orifice 24' thereby relieving the diaphragm 34 from that degree of suction necessary to cause it to contract, and it thereby returns to the position indicated in Fig. 8, opening the contact points 48 and 50 and breaking the circuit of the motor 14, causing the same to stop.

In the embodiment shown in Fig. 6 the operation is substantially the same as above described, except that the suction head 33 is in communication with the suction device 30 and the J spring is omitted. In this embodiment the suction holds the tape firmly against the suction head 33 and the resultant friction created holds the tape firmly against the support 12, and acts to absorb the remaining pulsations in the tape as ejected from the ticker 1. It will therefore be seen that the tape will be fed across the support 12 with a substantially non-pulsating motion.

While I have described the invention in connection with what is known as "ticker tape" it is to be understood that the invention is adapted for use with tapes of any width, and the term "tape" as used in the claims is to be accorded this interpretation. It will also be understood that in the broader aspects of the invention any suitable sensitive pneumatic control means may be substituted for the suction operated diaphragm above described; and that such pneumatic control means may govern the speed of the take-up motor of any suitable type and in any suitable manner, instead of having said device open and close the power circuit to an electrical motor as above described in the present preferred embodiment of the invention.

Having thus described my invention with particularity with reference to the preferred method of carrying out the same and in connection with the preferred apparatus for carrying out the same, and having referred to some of the possible modifications thereof, it will be obvious to those skilled in the art, after understanding my invention, that other changes and modifications may be made therein without departing from the spirit and scope of my invention, and I aim in the appended claims to cover such changes and modifications as are within the scope of the invention.

I claim:

1. Method of projecting images from image bearing tape, which comprises ejecting said tape from a device for recording images on said tape, causing a variable loop to be formed in the tape between said ejecting means and the projection axis, moving said tape past the projection axis, projecting said images during their movement past the projection axis, creating a localized pneumatic condition adjacent said loop, causing said tape to vary said pneumatic condition responsive to loop variations resulting in the difference between the feed of the tape to and from the loop, and controlling the feed of the tape from the loop in accordance with said pneumatic variations.

2. Method of projecting images from image bearing tape, which comprises pulsatingly ejecting said tape from a device for recording images on said tape, causing a variable loop to be formed in the tape between said ejecting means and the projection axis, substantially non-pulsatingly moving said tape past the projection axis, projecting said images during their movement past the projection axis, creating a localized suction adjacent said loop, causing said tape to vary said suction responsive to loop variations resulting in the difference between the feed of the tape to and from the loop, and controlling the feed of the tape from the loop in accordance with said suction variations.

3. In a device of the character described, the combination with means for recording on tape images to be projected, of means for projecting said images from said tape, a take-up motor for moving said tape past the projection axis of said projecting means, supporting means for said tape in its path of travel from said first means to said projection axis positioned to provide a gap between said first means and said projection axis for a loop of said tape, pneumatic means cooperating with said loop, and means controlled by said pneumatic means for controlling the movement of said tape past said projection axis.

4. In a device of the character described, the combination with means for recording on tape images to be projected, of means for projecting said images from said tape, a take-up motor for moving said tape past the projection axis of said projecting means, supporting means for said tape in its path of travel from said first means to said projection axis positioned to provide a gap between said first means and said projection axis for a loop of said tape, suction means cooperating with said loop, and means controlled by said suction means for controlling the movement of said tape past said projection axis.

5. In a device of the character described, the combination with means for pulsatingly recording on tape images to be projected, of means for projecting said images from said tape, a take-up motor for moving said tape past the projection axis of said projecting means, supporting means for said tape in its path of travel from said first means to said projection axis positioned to provide a gap between said first means and said projection axis for a loop of said tape, and means for pneumatically engaging said tape intermediate said recording means and said projection axis to produce a frictional resistance to thereby prevent said pulsations at said axis.

6. In a device of the character described, the combination with means for pulsatingly recording on tape images to be projected, of means for projecting said images from said tape, a take-up motor for moving said tape past the projection axis of said projecting means, supporting means for said tape in its path of travel from said first means to said projection axis positioned to provide a gap between said first means and said projection axis for a loop of said tape, means for pnuematically engaging said tape intermediate said recording means and said projection axis to produce a frictional resistance to thereby prevent said pulsations at said axis and for controlling the movement of said tape past said projection axis.

7. In a device of the character described, the combination with means for recording on tape images to be projected, of means for projecting said images from said tape, a take-up motor for moving said tape past the projection axis of said projecting means, supporting means for said tape in its path of travel from said first means to said projection axis positioned to provide a gap between said first means and said projection axis for a loop of said tape, pneumatic means cooperating with said loop, and means controlled by said pneumatic means and cooperating with said take-up motor for controlling the movement of said tape past said projection axis.

8. In a device of the character described, the combination with means for recording on tape images to be projected, of means for projecting said images from said tape, a take-up motor for moving said tape past the projection axis of said projecting means, supporting means for said tape in its path of travel from said first means to said projection axis positioned to provide a gap between said first means and said projection axis for a loop of said tape, suction means cooperating with said loop, and means controlled by said pneumatic means and cooperating with said take-up motor for controlling the movement of said tape past said projection axis.

9. In a device of the character described, the combination with means for recording on tape images to be projected, of means for projecting said images from said tape, a take-up motor for moving said tape past the projection axis of said projecting means, supporting means for said tape in its path of travel from said first means to said projection axis positioned to provide a gap between said first means and said projection axis for a variable loop of said tape, suction control means actuated responsive to variations in said loop, and an electrical circuit controlling said motor responsive to said suction control means to thereby control the movement of said tape past said projection axis.

10. In a device of the character described, the combination with means for recording on tape images to be projected, of means for projecting said images from said tape, a take-up motor for moving said tape past the projection axis of said projecting means, supporting means for said tape in its path of travel from said first means to said projection axis positioned to provide a gap between said first means and said projection axis for a variable loop of said tape, pneumatic control means actuated responsive to variations in said loop, and an electrical circuit controlling said motor responsive to the operation of said pneumatic control means to thereby control the movement of said tape past said projection axis.

11. In a device of the character described, the combination with means for recording on tape images to be projected, of means for projecting said images from said tape, a take-up motor for moving said tape past the projection axis of said projecting means, supporting means for said tape in its path of travel from said first means to said projection axis, positioned to provide a gap between said first means and said projection axis for a variable loop of said tape, said take-up motor when not retarded by control of the loop being adapted to feed the tape from the loop faster than the tape is fed to the loop, suction control means actuated responsive to variations in said loop resulting from said difference in tape feed, and an electric circuit controlling said motor responsive to said suction control means to maintain said loop.

12. In a device of the character described, the combination with means for recording on tape images to be projected, of means for projecting said images from said tape, a take-up motor for moving said tape past the projection axis of said projecting means, supporting means for said tape in its path of travel from said first means to said projection axis, positioned to provide a gap between said first means and said projection axis for a variable loop of said tape, said take-up motor when not retarded by control of the loop being adapted to feed the tape from the loop faster than the tape is fed to the loop, suction control means having a valve in the path of movement of the tape at the loop for venting said control means to atmospheric pressure and actuated responsive to variations of said loop relative to said valve, and an electric circuit controlling said motor responsive to said suction control means to maintain said loop.

13. In a device of the character described, the combination with means for recording on tape images to be projected, of means for projecting said images from said tape, a take-up motor for moving said tape past the projection axis of said projecting means, supporting means for said tape in its path of travel from said first means to said projection axis, positioned to provide a gap between said first means and said projection axis for a variable loop of said tape, said take-up motor when not retarded by control of the loop being adapted to feed the tape from the loop faster than the tape is fed to the loop, suction control means having a bellows with a connected valve in the path of movement of the tape at the loop for venting said bellows to atmospheric pressure and actuated responsive to variations in said loop relative to said valve, contacts actuated responsive to the movement of said bellows, and an electric circuit controlled by said contacts and controlling said motor responsive to the movement of said bellows to maintain said loop.

14. The method of projecting images from image bearing tape which consists in ejecting said tape from an image recording device, moving said image bearing tape through the projecting zone, projecting said images while passing through said projecting zone, creating a variable loop in the tape in advance of the projecting zone, creating pneumatic pressure adjacent said tape loop, and controlling said tape movement through said projecting zone by and in accordance with pneumatic pressure variations responsive to variations in said loop formation.

15. In a device of the character described, the combination of means for printing on tape images to be projected and moving the tape, means for projecting said images, a second means for moving said tape past said projecting means, and control means having a part positioned in the path of movement of and being operable by the under side of said tape and having a second part cooperating with said first part for regulating said second means responsive to and in accordance with the rate of feed of said first moving means.

16. In a device of the character described, the combination of means for printing on tape images to be projected and moving the tape, means for projecting said images, a second means for moving said tape past said projecting means, and pneumatic control means having a valve opening positioned in the path of movement of and being operable by the under side of said tape and having a second part cooperating with said first part for regulating said second means responsive to the rate of feed of said first moving means.

17. In a device of the character described, the combination of first means for moving tape bearing images to be projected in a first zone, second means for moving said tape in a second zone, means for projecting said images passing through said second zone, pneumatic suction means having a valve opening intermediate said first and second zones of movement and in the path of movement of said tape, and control means for regulating said second moving means and operable by said suction means responsive to the movement of said tape relative to said valve opening.

18. In a device of the character described, the combination of means for pulsatingly moving tape bearing images to be projected in a first zone, a second means for moving said tape in a second zone, means for projecting said images passing through said second zone, pneumatic suction means having a valve opening intermediate said first and second zones of movement and in the path of movement of a variable loop of said tape, and control means for regulating said second moving means and operable by said suction means responsive to a valve action of said loop resulting from loop variations.

19. The method of feeding tape bearing images to be projected and of projecting said images, which comprises imparting to said tape a first variable movement in a first zone and a second movement in a second zone, projecting images passing through said second zone, creating a variable loop between said first and second zones, creating a localized suction adjacent said loop, causing said tape to vary said suction responsive to loop variations, and controlling said second movement by means of and in accordance with said suction variations.

20. The method of feeding tape bearing images to be projected and of projecting said images, which comprises imparting to said tape a first movement in a first zone and a second movement in a second zone, projecting images passing through one of said zones, creating a localized suction intermediate said zones, causing said tape to vary said suction responsive to variations in said tape movement in the other of said zones, and controlling said movement in said first zone by means of and in accordance with said suction variations.

21. In a device of the character described, the combination of first feed means for pulsatingly moving tape in a first zone, second feed means for moving tape in a second zone, projecting images passing through said second zone and pneumatic control means having a valve opening positioned in the path of movement of said tape and operable by said tape intermediate said zones and having a part governed by the operation of said valve for varying the speed of said tape in said second zone responsive to variations in the speed of tape in said first zone.

22. In a device of the character described, the combination with means for pulsatingly recording on tape images to be projected, of means for projecting said images from said tape, a take-up motor for moving said tape past the projection axis of said projecting means, supporting means for said tape in its path of travel from said first means to said projection axis, and suction means having an orifice positioned closely contiguous the lower surface of said tape intermediate said recording means and said projection axis to effectuate a frictional resistance on that portion of said tape passing between said recording means and projection axis to thereby prevent said pulsations at said axis.

JOSHUA WARD.